(12) United States Patent
Araki et al.

(10) Patent No.: US 6,559,209 B1
(45) Date of Patent: *May 6, 2003

(54) RUBBER COMPOSITION AND PNEUMATIC TIRE

(75) Inventors: Shunji Araki, Kodaira (JP); Masaaki Tsuchihashi, Wakayama (JP); Isao Nishi, Wakayama (JP)

(73) Assignees: Bridgestone Corporation, Tokyo (JP); Kao Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/930,817

(22) PCT Filed: Jun. 26, 1997

(86) PCT No.: PCT/JP97/02224
§ 371 (c)(1),
(2), (4) Date: Oct. 9, 1997

(87) PCT Pub. No.: WO97/35461
PCT Pub. Date: Oct. 2, 1997

(30) Foreign Application Priority Data

Jun. 26, 1996 (JP) .............................. 8-166052

(51) Int. Cl.$^7$ .............................. B60G 1/00; C08K 5/17
(52) U.S. Cl. .................. 524/236; 524/243; 524/246; 524/247; 524/248; 524/251; 524/257; 524/258; 152/209.1
(58) Field of Search ................... 524/236–258, 524/261–269, 492, 493, 495, 496

(56) References Cited

U.S. PATENT DOCUMENTS

| | | | | |
|---|---|---|---|---|
| 3,691,129 A | * | 9/1972 | Burke, Jr. .................... | 524/237 |
| 3,700,690 A | * | 10/1972 | Burke, Jr. .................... | 524/238 |
| 3,897,070 A | * | 7/1975 | Anderson et al. ............... | 277/1 |
| 3,898,253 A | * | 8/1975 | Buckler et al. ............. | 524/451 |
| 4,179,421 A | * | 12/1979 | Edwards et al. ............ | 524/251 |
| 4,256,857 A | * | 3/1981 | Buckler et al. ............. | 525/331 |
| 4,357,432 A | * | 11/1982 | Edwards ...................... | 524/251 |
| 4,675,355 A | * | 6/1987 | Hirata et al. ................. | 524/236 |
| 4,687,794 A | * | 8/1987 | Huddleston et al. ........ | 523/351 |
| 4,732,928 A | * | 3/1988 | Mizushiro et al. ........... | 524/505 |
| 4,843,114 A | * | 6/1989 | Touchet et al. ............. | 524/255 |
| 5,023,006 A | * | 6/1991 | Davidson et al. ........... | 524/258 |
| 5,244,028 A | * | 9/1993 | Segatta et al. ............... | 524/255 |
| 5,393,816 A | * | 2/1995 | Kondo et al. ................ | 524/247 |
| 5,441,573 A | * | 8/1995 | Kondo et al. ................ | 524/247 |
| 5,556,572 A | * | 9/1996 | Nishinaka et al. .......... | 524/247 |
| 5,714,533 A | * | 2/1998 | Hatakeyama et al. ........ | 524/247 |
| 5,939,484 A | * | 8/1999 | Araki et al. ................. | 524/492 |
| 5,939,493 A | * | 8/1999 | Hojo .......................... | 524/210 |

FOREIGN PATENT DOCUMENTS

| | | |
|---|---|---|
| EP | 0 525 585 A | 7/1992 |
| JP | 6328860 | 1/1979 |
| JP | 3111438 | 5/1991 |
| JP | 3197536 A | 8/1991 |
| JP | 3252431 | 11/1991 |
| JP | 551484 A | 3/1993 |
| JP | 6157825 | 6/1994 |
| JP | 7179666 | 7/1995 |
| WO | WO 9735461 | 10/1997 |

OTHER PUBLICATIONS

New Riverside University Dictionary p. 275.*
Patent Abstracts of Japan vol. 013, No. 315, Jul. 18, 1989 (JP 01 101344 A) Apr. 19, 1989 & Database WPI Derwent Publications Ltd., London GB; AN 160434, Apr. 19, 1989 *abstract*.
Patent Abstracts of Japan vol. 1997, No. 07, Jul. 31, 1997 (JP 09 059478 A) Mar. 4, 1997 & Database WPI Derwent Publications Ltd., London GB; AN 209494, Mar. 4, 1997 *abstract*.

* cited by examiner

*Primary Examiner*—Peter Szekely
(74) *Attorney, Agent, or Firm*—Sughrue Mion, PLLC

(57) ABSTRACT

A rubber composition and method of making a rubber composition which is improved in a dispersibility of silica into rubber, a heat generating property and an abrasion property. The rubber composition comprises 15 to 85 parts by weight of silica per 100 parts by weight of a rubber component comprising natural rubber and/or diene base synthetic rubber and a tertiary amine compound represented by the following Formula (I) blended in a proportion of 1 to 15% by weight based on the amount of silica:

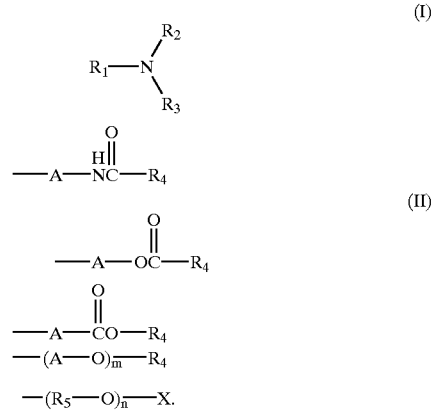

16 Claims, No Drawings

RUBBER COMPOSITION AND PNEUMATIC TIRE

TECHNICAL FIELD

The present invention relates to a rubber composition blended with silica, which is improved in a dispersibility of silica into rubber, a heat generating property and an abrasion resistance, and a pneumatic tire using said rubber composition.

BACKGROUND ART

Carbon black has so far been used as a reinforcing filler for rubber. This is because carbon black has both a high reinforcing property and a high abrasion resistance as compared with other fillers. In recent years, under the circumstances of social requirements for saving energy and natural resources, particularly in order to save fuel consumption of automobiles, a rubber composition has come to be required to have a low heat generating property as well.

In the case of intending to provide a low heat generating property to a rubber composition by virtue of carbon black, it is considered to blend carbon black in a small quantity or to use carbon black having a large particle size. In either method, however, it is well known that a low heat generating property has an antinomic relation with a reinforcing property and an abrasion resistance.

On the other hand, silica is known as a filler for a rubber composition providing a low heat generating property, and many patents such as Japanese Patent Application Laid-Open No. Hei 3-252431 have so far been filed.

Silica, however, tends to cause the particles thereof to coagulate due to a hydrogen bond between silanol groups which is a functional group on the surface, and therefore the mixing time has to be extended in order to improve the dispersion of silica particles into rubber. Further, silica has had defects that since the dispersion of silica particles into rubber is insufficient, the Mooney viscosity of the rubber composition rises and processability, for example, extrusion is inferior.

Further, silica has had a defect as well that since a silica particle has an acidic surface and adsorbs a base material used as a vulcanization accelerator, the rubber composition is not sufficiently vulcanized and therefore the modulus of elasticity is not increased.

A silane coupling agent has been developed in order to improve these defects, but the dispersion of silica has not yet reached a sufficiently high level. In particular, it has been difficult to obtain the industrially sufficient dispersion of silica.

Further, it is disclosed in Japanese Patent Application Laid-Open No. Hei 5-51484 to blend silylation agents in order to improve the dispersibility of silica. The silylation, however, has the defects that silica has to be reacted with the silylation agents in a short time of mixing and therefore the reaction efficiency is not sufficiently high and that these silylation agents have low boiling points and are volatilized during mixing and therefore the reaction does not go on sufficiently.

Further, it is disclosed in Japanese Patent Publication No. Sho 63-2886 and Japanese Patent Application Laid-Open No. Hei 6-157825 to use hydrophobic precipitated silicic acid. In those cases, however, there have been the defect that since precipitated silicic acid subjected to complete hydrophobic treatment is used, silanol groups on the surface with which a silane coupling agent is to react have been lost and therefore the rubber is not sufficiently reinforced.

On the other hand, disclosed in Japanese Patent Application Laid-Open No. Hei 3-197536 is a rubber composition having an improved heat generating property, in which blended are 20 to 150 parts by weight of a reinforcing filler such as carbon black, and 0.05 to 20 parts by weight of an alkylamine compound per 100 parts by weight of at least one rubber selected from the group consisting of natural rubber and diene base synthetic rubber.

In Japanese Patent Application Laid-Open No. Hei 3-197536 described above, the alkylamine compound is blended in order to improve the heat generating property. However, it neither described nor suggested that the dipersibility of silica as well as a heat generating property and an abrasion resistance is improved in a rubber composition containing silica.

The present invention is intended to solve the conventional problems described above, and an object thereof is to provide a rubber composition which is improved in a dispersibility of silica into rubber, a heat generating property and an abrasion resistance, and to provide a pneumatic tire using the same.

DISCLOSURE OF THE INVENTION

Intensive researches made by the present inventors in order to solve the problems described above have resulted in successfully obtaining a rubber composition which is improved in dispersion of silica into rubber to a large extent and is provided with a low heat generating property and a high abrasion resistance by mixing a specific dispersion improving agent with a prescribed amount of silica, and a pneumatic tire using said rubber composition, and thus coming to complete the present invention.

That is, the rubber composition and the pneumatic tire of the present invention resides in the following items (1) to (7):

(1) A rubber composition comprising 15 to 85 parts by weight of silica per 100 parts by weight of a rubber component comprising natural rubber and/or diene base synthetic rubber and a tertiary amine compound represented by the following Formula (I) blended in a proportion of 1 to 15% by weight based on the amount of silica described above:

(I)

wherein $R_1$ represents an alkyl group, alkenyl group or alkoxyl group having 1 to 36 carbon atoms and hydroxy-substituted group thereof, a benzyl group, a benzyl group substituted with an alkyl group or alkenyl group having 4 to 36 carbon atoms, or a group represented by one of the following Formulas (II); and $R_2$ and $R_3$ independently represent an alkyl group or alkenyl group having 1 to 36 carbon atoms, a benzyl group, a cyclohexyl group and a hydroxy-substituted group thereof:

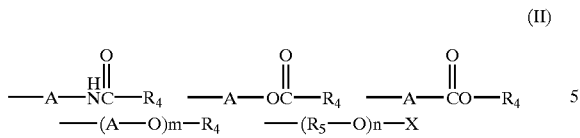

(II)

wherein $R_4$ represents an alkyl group or alkenyl group having 1 to 36 carbon atoms; $R_5$ represents an ethylene group or a propylene group; X represents hydrogen, an alkyl group, alkenyl group, alkanoyl group or alkenoyl group having 1 to 18 carbon atoms; A represents an alkylene group or hydroxyalkylene group having 2 to 6 carbon atoms; m is an integer of 1 to 10, and when m is 2 or more, respective A may be the same or different; and n is an integer of 1 to 10.

(2) The rubber composition as described in the above item (1), wherein the tertiary amine compound represented by the Formula (I) described above has a molecular weight of 180 or more.

(3) The rubber composition as described in the above item (1), wherein the tertiary amine compound represented by Formula (I) described above is dimethylalkylamine in which $R_1$ and $R_2$ are both a methyl group and $R_3$ is an alkyl group having 12 to 36 carbon atoms.

(4) The rubber composition as described in the above item (1), wherein the tertiary amine compound represented by the Formula (I) described above is dimethylstearylamine.

(5) The rubber composition as described in the above item (1), further comprising a silane coupling agent blended in a proportion of 1 to 15% by weight based on the amount of silica.

(6) The rubber composition as described in the above item (1), further comprising carbon black of 20 to 80 parts by weight per 100 parts by weight of the rubber component.

(7) A pneumatic tire comprising a tread part, a side wall part and a bead part, wherein the above tread part comprises the rubber composition as described in any of the items (1) to (6).

BEST MODE FOR CARRYING OUT THE INVENTION

The embodiment of the present invention shall be explained below in detail.

Natural rubber (NR) or synthetic rubber can be used alone or by blending them as a rubber component in the present invention. The synthetic rubber includes, for example, synthetic polyisoprene rubber (IR), polybutadiene rubber (BR) and styrene-butadiene rubber (SBR).

For example, precipitated silica is preferred as silica used in the present invention, but no specific restrictions shall be put thereon. The blend amount of silica is 15 to 85 parts by weight per 100 parts by weight of the rubber component described above. If the blending amount of silica is less than 15 parts by weight, the sufficient reinforcing property is not exerted, and if the blending amount exceeds 85 parts by weight, the processability such as warming up and extrusion is deteriorated. The blending amount of silica is preferably 20 to 65 parts by weight in terms of the reinforcing property, the low heat generating property and the processability.

The amine compound used as a dispersion improving agent of the present invention is the tertiary amine compound represented by the following Formula (I):

(I)

wherein $R_1$ represents an alkyl group, alkenyl group or alkoxyl group having 1 to 36 carbon atoms and hydroxy-substituted group thereof, a benzyl group, a benzyl group substituted with an alkyl group or alkenyl group having 4 to 36 carbon atoms, or a group represented by one of the following Formulas (II); and $R_2$ and $R_3$ independently represent an alkyl group or alkenyl group having 1 to 36 carbon atoms, a benzyl group, a cyclohexyl group and a hydroxy-substituted group of thereof:

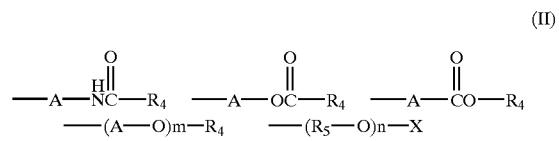

(II)

wherein $R_4$ represents an alkyl group or alkenyl group having 1 to 36 carbon atoms; $R_5$ represents an ethylene group or a propylene group; X represents hydrogen, an alkyl group, alkenyl group, alkanoyl group or alkenoyl group having 1 to 18 carbon atoms; A represents an alkylene group or hydroxyalkylene group having 2 to 6 carbon atoms; m is an integer of 1 to 10, and when m is 2 or more, respective A may be the same or different; and n is an integer of 1 to 10.

To be specific, $R_1$ includes methyl, ethyl, propyl, lauryl, stearyl, laurolyaminoethylene, stearoyloxyethylene, acryloyloxypropylene, methacryloyloxypropylene, 2-hydroxymethyl, 2-hydroxydodecyl, benzyl and cyclohexyl groups.

To be specific, $R_2$ and $R_3$ include methyl, ethyl, lauryl, stearyl, vinyl, allyl, 3-allyoxy-2-hydroxypropyl, benzyl and hydroxyethyl groups.

To be specific, $R_4$ includes methyl, ethyl, lauryl, stearyl, vinyl and allyl groups.

To be specific, X includes a hydrogen atom, ethyl, lauryl, stearyl, vinyl, allyl, lauroyl, stearoyl, acryloyl and methacryloyl groups.

The specific examples of the tertiary amine compound used in the present invention include trioctylamine, dimethyldecylamine, dimethylmyristylamine, dimethyloctadecenylamine, dimethylhexadecenylamine, dimethylmethacryloxypropylamine, methyldivinylamine, N,N,N-trilaurylamine, N,N,N-tristearylamine, N,N-dimethyl-N-laurylamine, N,N-dimethyl-N-stearylamine, N-methyl-N,N-dilaurylamine, N-methyl-N,N-distearylamine, N,N-dibenzyl-N-stearylamine, N-benzyl-N,N-dilaurylamine, N,N-diallyl-N-stearylamine, N,N-diallyl-N-laurylamine, N,N-dimethyl-N-lauryloyloxyethylamine, N,N-dimethyl-N-stearoyloxyethylamine, N,N-dimethyl-N'-lauroylpropylamine, N,N-dihydroxyethyl-N-stearylamine, N,N-dihydroxyethyl-N-laurylamine, N,N-dihydroxyethyl-N-2-hydroxydodecylamine, N,N-polyoxyethylene-N-stearylamine, N,N-di(-2-hydroxy-3-allyloxypropyl)-N-hexadecylamine, N,N-di(-2-hydroxy-3-allyloxypropyl)-N-octadecylamine, N,N-di(-2-hydroxy-3-acryloxycarbonyl)propyl-N-hexadecylamine, N,N-di(-2-hydroxy-3-acrylyloxycarbonyl)propyl-N-octadecylamine, N,N-di(-5-hydroxy-3,7-dioxy-9-decyl-1-yl)-N-octadecylamine, and esterified compounds with acrylic acid, methacrylic acid and fatty acids.

Preferably, the tertiary amine compound is a dimethylalkylamine in which $R_1$ and $R_2$ are both a methyl group and $R_3$ is an alkyl group having 12 to 36 carbon atoms, more preferably dimethylstearylamine from the viewpoint of a flash point, a low heat generating property and an improvement in dispersion.

The blending amount of the tertiary amine compound described above has to be 1 to 15% by weight, preferably 3 to 10% by weight based on the amount of silica. If the blending amount of the tertiary amine compound described above is less than 1% by weight, the intended dispersibility, low heat generating property and abrasion resistance can not sufficiently be improved. On the other hand, the blending amount exceeding 15% by weight saturates the dispersion improving effect on silica and causes the tertiary amine compound to act as a plasticizer, so that the abrasion resistance is lowered (this matter shall further be explained in detail in the examples).

The tertiary amine compound used in the present invention has preferably a molecular weight of 180 or more. If the tertiary amine compound has a molecular weight lower than 180, the flash point is low, and there is a risk of ignition during the processing steps. Accordingly, it is not preferred.

The silane coupling agent used in the present invention is not specifically restricted as long as it is usually used in the rubber industry. To be specific, it includes bis(3-triethoxysilylpropyl)polysulfide, γ-mercaptopropyltriethoxysilane, γ-aminopropyltriethoxysilane, N-phenyl-γ-aminopropyltrimethoxysilane and N-β-(aminoethyl)-γ-aminopropyltrimethoxysilane. The blending amount of the silane coupling agent is preferably 1 to 15% by weight, more preferably 5 to 12% by weight based on the weight of silica. If the blending amount of the silane coupling agent is less than 1% by weight, the coupling effect is small, and the blending amount exceeding 15% by weight brings about gelation of the polymer. Accordingly, both are not preferred.

SAF, ISAF and HAF can preferably be used as carbon black used in the present invention, but it shall not specifically be restricted. The blending amount of carbon black is preferably 20 to 80 parts by weight per 100 parts by weight of the rubber component described above from the viewpoint of the reinforcing property and the low heat generating property. The blending amount of carbon black exceeding 80 parts by weight deteriorates the heat generating property to a large extent. The blending amount of 25 to 60 parts by weight provides the marked effects.

In the present invention, compounding agents usually used in the rubber industry such as softening agents, antioxidants, vulcanizing agents, vulcanization accelerators and vulcanization accelerating auxiliaries as well as the rubber component, silica, the tertiary amine compound, the silane coupling agent and the carbon black each described above can suitably be blended if necessary.

The rubber composition and the pneumatic tire of the present invention can be produced by mixing the rubber component, silica, the tertiary amine compound, the silane coupling agent and the carbon black each described above and the above rubber compounding agents blended with necessity by means of a banbury mixer and the like.

It is presumed that the rubber composition and the pneumatic tire of the present invention are improved in a dispersibility of silica into rubber to a large extent as well as a heat generating property and an abrasion resistance by the following action mechanism.

Usually, silica causes the particles thereof to coagulate due to a hydrogen bond of a silanol group which is a functional group on the surface and comes to be inferior in dispersion in rubber.

Further, the silane coupling agent usually used in the rubber industry reduces the number of silanol groups present on the surface of a silica particle by a dehydration-condensation reaction of the silanol group with a silanol group produced by hydrolysis of an alkoxyl group of the silane coupling agent to improve the dispersion of silica in rubber. This reaction is, however, difficult to take place at low temperatures and considered to proceed at temperatures of 140° C. or higher. On the other hand, a three dimensional cross-linking reaction of rubber is brought about by the silane coupling agent at high temperatures of 170° C. or higher, and the viscosity goes up drastically. In practice, temperatures of mixing rubber go up quickly at a rubber mixing step, and therefore a sufficiently long time for reaction between the silane coupling agent and silica can not be spent.

On the other hand, it is considered that the nitrogen atom in the tertiary amine compound described above has a high capacity of forming a hydrogen bond with a silanol group present on the surface of silica to exert the masking effect on the silanol group present on the surface of silica, thereby preventing the silica particles from coagulating each other. This reaction is not a primary bond but chemical adsorption, and therefore this effect can be displayed in a low temperature region close to room temperature.

Accordingly, an effect for preventing the silica particles from coagulating is exerted from the beginning of mixing rubber in a low temperature region. As a result, it is presumed that the rubber composition and the pneumatic tire of the present invention are improved in a dispersibility of silica into rubber to a large extent as well as a heat generating property and an abrasion resistance.

EXAMPLES

The present invention shall more specifically be explained below with reference to examples but the present invention shall by no means be restricted by these examples.

Examples 1 to 13 and Comparative Examples 1 to 8

The rubber compositions were prepared according to the basic blending formula shown in the following Table 1 and the blending compositions shown in the following Table 2 and Table 3. A weight unit shown in the tables is part by weight.

The Payne effect (ΔE'), the low heat generating property and the abrasion property of the rubber compositions obtained in Examples 1 to 13 and Comparative Examples 1 to 8 were evaluated by the following evaluation methods.

The results thereof are shown in the following Table 2 and Table 3.

(1) Payne effect (ΔE')

When a kinetic tensile strain was changed in the range of 0.1 to 5% under the conditions of a frequency of 50 Hz, an initial load of 100 g and 25° C., a change in E' (dynamic storage modulus of elasticity) was determined by means of a visco-elasticity spectrometer manufactured by Toyo Seiki Seisakusho Co., Ltd.

A slab sheet having a thickness of 2 mm and a width of 5 mm was used for a test piece, and a distance between clamps was set to 2 cm. The initial load was set to 100 g. ΔE' was shown by:

$$\Delta = E'_{max} - E'_{min}$$

and expressed in terms of an index obtained by contrast with a control.

The Payne effect is considered to show the degree of the dispersion of a filler into rubber, and the smaller the value of the index is, the smaller the ΔE' is, and the better the dispersion of the filler into rubber is.

(2) Low heat generating property

An impact resilience factor determined at a temperature of 25° C. according to JIS K6255-1996 (3) by means of an apparatus of the reference 2 of said JIS was used to express the low heat generating property in terms of an index obtained by contrast with a control. The smaller the value of the index is, the higher the impact resilience factor is, and the better the low heat generating property is.

(3) Abrasion resistance

An abrasion resistance index showing an abrasion resistance was determined at a ground contacting pressure on tire surface of 5 kg/cm² and a slip ratio of 40% according to JIS K6264-1993 by means of a Lamborn abrasion tester and calculated according to the following equation:

Abrasion resistance index=[(lost weight of control)/(lost weight of test piece)]×100

It is shown that the larger this index is, the better the abrasion resistance is. In the evaluation described above, the rubber composition prepared in Comparative Example 1 was set as a control.

(4) Measurement of rolling resistance performance

The rubber composition was applied to the tread of a tire for a passenger car having a size of 195/65R15. The tire prepared above was attached to a rim 6JJ, inflated to an inner pressure of 2.0 kg/cm² and, under a load of 440 kg, was come to contact with a drum having an outer diameter of 1.7 m, and the drum was rotated. The speed was increased to a fixed speed, and then the drum was allowed to rotate inertially. The moment of inertia was measured when the speed reached 80 km/hour. Rolling resistance was evaluated from the obtained moment of inertia in accordance with the following equation:

index=[(moment of inertia of control tire)/(moment of inertia of sample tire)]×100

The calculated value is expressed as an index with the value of Comparative Example 1 being set to 100. The larger the index is, the better the rolling resistance is.

The larger value is preferred.

(5) Measurement of field abrasion resistance

The tire was installed on a homemade automobile of 2,000 cc to measure the depth of a residual groove after running 10,000 km, and the field abrasion resistance was evaluated according to the following equation:

[(depth of residual groove of tire prepared in Comparative Example 1)/(depth of residual groove of tire to be tested)]

The larger value is preferred.

TABLE 1

| Blended component | Parts by weight |
| --- | --- |
| Rubber component | 100 |
| Silica | Variable |
| Carbon black | Variable |
| Aromatic oil | 20 |
| Stearic acid | 2 |
| Silane coupling agent Si69[*1] | Variable |
| Tertiary amine compound | Variable |
| Zinc oxide | 3 |
| Antioxidant[*2] | 1 |
| Vulcanization accelerator[*3] | 1.5 |
| Sulfur | 1.5 |

[*1]Bis(3-triethoxysilylpropyl)tetrasulfide manufactured by Degussa AG.
[*2]N-phenyl-N'-isopropyl-p-phenylenediamine
[*3]N-oxydiethylene-2-benzothiazolesulfenamide

TABLE 2

|  | Comparative Example 1 | Example 1 | Example 2 | Example 3 | Comparative Example 2 | Example 4 | Example 5 | Example 6 | Example 7 | Example 8 |
| --- | --- | --- | --- | --- | --- | --- | --- | --- | --- | --- |
| Blended component |  |  |  |  |  |  |  |  |  |  |
| BRO1[*1] |  |  |  |  |  |  |  |  |  |  |
| SBR1500[*1] | 65 | 65 | 65 | 65 | 65 | 65 | 65 | 65 | 65 | 65 |
| NR | 35 | 35 | 35 | 35 | 35 | 35 | 35 | 35 | 35 | 35 |
| Silica (Nipsil AQ)[*2] | 60 | 60 | 60 | 60 | 60 | 60 | 60 | 60 | 60 | 80 |
| Carbon black (Seast 3H)[*3] |  |  |  |  |  |  |  |  |  |  |
| Si69[*4] | 6 | 6 | 6 | 6 | 6 | 6 | 6 | 6 | 6 | 8 |
| Dimethylstearylamine (M.W. 297) |  | 1 | 3 | 9 | 12 |  |  |  |  | 4 |
| Dimethyldecylamine (M.W. 185) |  |  |  |  |  | 3 |  |  |  |  |
| Dimethylmyristylamine (M.W. 241) |  |  |  |  |  |  | 3 |  |  |  |
| Trioctylamine (M.W. 354) |  |  |  |  |  |  |  | 3 |  |  |
| Trilaurylamine (M.W. 521) |  |  |  |  |  |  |  |  | 3 |  |
| Evaluation |  |  |  |  |  |  |  |  |  |  |
| Payne effect | 100 | 98 | 88 | 82 | 81 | 80 | 86 | 92 | 96 | 98 |
| Low neat generation property | 100 | 97 | 90 | 83 | 82 | 81 | 88 | 92 | 98 | 99 |
| Abrasion resistance | 100 | 106 | 104 | 101 | 95 | 102 | 104 | 105 | 105 | 118 |
| Rolling resistance | 100 | 98 | 96 | 94 | 94 | 93 | 96 | 97 | 98 | 99 |
| Field abrasion resistance | 100 | 107 | 106 | 103 | 92 | 105 | 105 | 108 | 107 | 120 |

[*1]manufactured by Nippon Synthetic Rubber Co., Ltd.
[*2]manufactured by Nippon Silica Ind. Co., Ltd.
[*3]manufactured by Tokai Carbon Co., Ltd.
[*4]Bis(3-triethoxysilylpropyl)tetrasulfide manufactured by Degussa AG.

TABLE 3

|  | Comparative Example 3 | Example 9 | Example 10 | Comparative Example 4 | Example 11 | Comparative Example 5 | Example 12 |
|---|---|---|---|---|---|---|---|
| Blended component |  |  |  |  |  |  |  |
| BRO1*1 |  |  | 20 |  |  |  |  |
| SBR1500*1 | 65 | 40 | 45 |  |  |  |  |
| NR | 35 | 60 | 35 | 100 | 100 | 100 | 100 |
| Silica (Nipsil AQ)*2 | 90 | 60 | 60 | 30 | 30 | 10 | 20 |
| Carbon black (Seast 3H)*3 |  |  |  | 60 | 60 | 80 | 70 |
| Si69*4 | 9 | 6 | 6 | 3 | 3 | 1 | 2 |
| Dimethylstearylamine (M.W. 297) | 4.5 | 3 | 3 |  | 1.5 | 1 | 2 |
| Dimethyldecylamine (M.W. 185) |  |  |  |  |  |  |  |
| Dimethylmyristlamine (M.W. 241) |  |  |  |  |  |  |  |
| Trioctylamine (M.W. 354) |  |  |  |  |  |  |  |
| Trilaurylamine (M.W. 521) |  |  |  |  |  |  |  |
| Evaluation |  |  |  |  |  |  |  |
| Payne effect | 114 | 92 | 87 | 100 | 92 | 102 | 98 |
| Low neat generation property | 112 | 92 | 86 | 100 | 91 | 104 | 98 |
| Abrasion resistance | 124 | 105 | 114 | 100 | 104 | 112 | 108 |
| Rolling resistance | 105 | 97 | 95 | 100 | 96 | 102 | 97 |
| Field abrasion resistance | 122 | 108 | 112 | 100 | 104 | 110 | 107 |

*1manufactured by Nippon Synthetic Rubber Co., Ltd.
*2manufactured by Nippon Silica Ind. Co., Ltd.
*3manufactured by Tokai Carbon Co., Ltd.
*4Bis(3-triethoxysilylpropyl)tetrasulfide manufactured by Degussa AG.

It has become clear that from a general point of view, the high dispersibility of silica into rubber, the low heat generating property and the excellent abrasion resistance are provided in Examples 1 to 12 falling within the scope of the present invention as compared with Comparative Examples 1 to 8 falling outside the scope of the present invention.

Observing individually, provided in Examples 1 to 3 are the rubber compositions obtained by blending the rubber components, silica, the silane coupling agents and the tertiary amine compounds each falling within the scope of the present invention and the pneumatic tires, and it has become clear that the high dispersibility of silica into rubber, the low heat generating property and the excellent abrasion resistance are provided in Examples 1 to 3 as compared with Comparative Example 1 (control) which has a composition different from the blending compositions of Examples 1 to 3 only in that the tertiary amine compound is not blended.

Comparative Example 2 falls outside the scope of the present invention, wherein the tertiary amine compound is blended in a proportion of 20% by weight (>15% by weight) based on the weight of silica. Not only the dispersion-improving effect of silica is saturated, but the abrasion resistance is deteriorated.

Provided in Examples 4 to 12 are the rubber compositions obtained by blending the rubber components, silica, the silane coupling agents and various tertiary amine compounds each falling within the scope of the present invention and the pneumatic tires using the same, and it has become clear that the high dispersibility of silica into rubber, the low heat generating property and the excellent abrasion resistance are provided in Examples 4 to 12 as compared with controls (Comparative Example 1 and Comparative Example 4) which have compositions different from the blending compositions of Examples 4 to 12 only in that the tertiary amine compound is not blended.

Comparative Example 3 falls outside the scope of the present invention, wherein the blend amount of silica is 90 parts by weight (>85 parts by weight) per 100 parts by weight of the rubber component. It has become clear that while the abrasion resistance is improved, the dispersibility of silica into rubber is rather deteriorated and the heat generating property is worsened as well.

Comparative Examples 4 to 5 and Examples 11 to 12 use silica and carbon black together, and Comparative Example 4 is a control.

Comparative Example 5 falls outside the scope of the present invention, wherein the blending amount of silica is short of 15 parts by weight which is the lower limit. The low heat generating property of the rubber composition is inferior, and the rolling resistance of the pneumatic tire is inferior as well.

Summarizing the results described above, it has become clear that the rubber compositions and the pneumatic tires of the present invention are improved in a dispersibility of silica into rubber, a heat generating property and an abrasion resistance only when blended are silica of 15 to 85 parts by weight per 100 parts by weight of natural rubber and/or diene base synthetic rubber and the tertiary amine compound represented by the Formula (I) described above of 1 to 15% by weight based on the amount of silica.

Industrial Applicability

The rubber composition and the pneumatic tire of the present invention can suitably be used for uses in which a low heat generating property and a high abrasion resistance are required. In particular, they can suitably be applied to rubber products such as tires, conveyor belts and hoses.

What is claimed is:

1. A method of preparing a rubber composition which comprises a step of mixing a rubber component consisting of at least one rubber selected from the group consisting of natural rubber (NR), synthetic polyisoprene rubber (IR), polybutadiene rubber (BR) and styrene-butadiene rubber (SBR), a vulcanizing agent, 15 to 85 parts by weight of silica particles per 100 parts by weight of the rubber component, a silane coupling agent in a proportion of 1 to 15% by weight based on the amount of silica and a tertiary amine compound represented by the following Formula (I) in a proportion of 1 to 15% by weight based on the amount of silica:

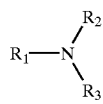

(I)

wherein $R_1$ represents an alkyl group, an alkenyl group, a hydroxy-substituted alkenyl group, an alkoxyl group having 1 to 36 carbon atoms or a hydroxy-substituted alkoxyl group having 1 to 36 carbon atoms, a, benzyl group, a benzyl group substituted with an alkyl group or a benzyl group substituted with an alkenyl group having 4 to 36 carbon atoms, or a group represented by the following Formulae (II); and $R_2$ and $R_3$ represent independently an alkyl group, an alkenyl group or a hydroxy-substituted alkenyl group having 1 to 36 carbon atoms, a benzyl group, a hydroxy-substituted benzyl group, a cyclohexyl group or a hydroxy-substituted cyclohexyl group:

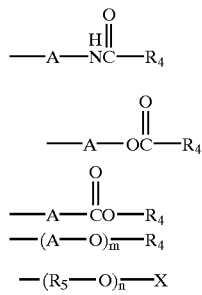

(II)

wherein $R_4$ represents an alkyl group or alkenyl group having 1 to 36 carbon atoms; $R_5$ represents an ethylene group or a propylene group; X represents an alkyl group, an alkenyl group, an alkanoyl group or an alkenoyl group having 1 to 18 carbon atoms; A represents an alkylene group or a hydroxyalkylene group having 2 to 6 carbon atoms; m is an integer of 1 to 10, and when in is 2 or more, each respective A may be the same or different; and n is an integer of 1 to 10.

2. The method of preparing the rubber composition as described in claim 1, wherein the tertiary amine compound represented by Formula (I) has a molecular weight of 180 or more.

3. The method of preparing the rubber composition as described in claim 1, wherein Formula (I) represents a dimethylalkylamine in which $R_1$ and $R_2$ are both a methyl group and $R_3$ has 12 to 36 carbon atoms.

4. The method of preparing the rubber composition as described in the claim 1, wherein the tertiary amine compound represented by Formula (I) is dimethylstearylamine.

5. The method of preparing the rubber composition as described in claim 1, wherein carbon black is mixed in an amount of 20 to 80 parts by weight per 100 parts by weight of the rubber component.

6. The method of preparing the rubber composition as described in claim 1, wherein the blending amount of the tertiary amine compound 3 to 10% by weight based on the amount of silica.

7. A pneumatic tire comprising a tread part, a side wall part and a bead part, wherein said tread part comprises the rubber composition prepared by a method described in any of claims 1–6.

8. The method of preparing the rubber composition as described in claim 1, wherein the silica particles are precipitated silica particles.

9. A method of preparing a rubber composition which comprises a step of mixing by a banbury mixer, a rubber component consisting of at least one rubber selected from the group consisting of natural rubber (NR), synthetic polyisoprene rubber (IR), polybutadiene rubber (BR) and styrene-butadiene rubber (SBR), a vulcanizing agent, 15 to 85 parts by weight of silica particles per 100 parts by weight of the rubber component, a silane coupling agent in a proportion of 1 to 15% by weight based on the amount of silica and a tertiary amine compound represented by the following Formula (I) in a proportion of 1 to 15% by weight based on the amount of silica:

(I)

wherein $R_1$ represents an alkyl group, an alkenyl group, a hydroxy-substituted alkenyl group, an alkoxyl group having 1 to 36 carbon atoms or a hydroxy-substituted alkoxyl group having 1 to 36 carbon atoms, a benzyl group, a benzyl group substituted with an alkyl group or a benzyl group substituted with an alkenyl group having 4 to 36 carbon atoms, or a group represented by the following Formulae (II); and $R_2$ and $R_3$ represent independently an alkyl group, an alkenyl group or a hydroxy-substituted alkenyl group having 1 to 36 carbon atoms, a benzyl group, a hydroxy-substituted benzyl group, a cyclohexyl group or a hydroxy-substituted cyclohexyl group:

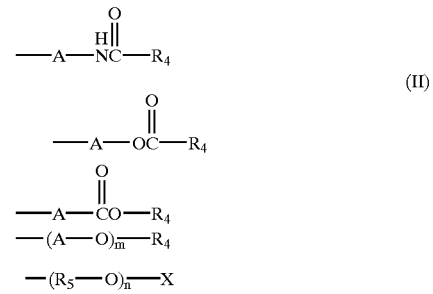

(II)

wherein $R_4$ represents an alkyl group or alkenyl group having 1 to 36 carbon atoms; $R_5$ represents an ethylene group or a propylene group; X represents an alkyl group, an alkenyl group, an alkanoyl group or an alkenoyl group having 1 to 18 carbon atoms; A represents an alkylene group or a hydroxyalkylene group having 2 to 6 carbon atoms; m is an integer of 1 to 10, and when m is 2 or more, each respective A may be the same or different; and n is an integer of 1 to 10.

10. The method of preparing the rubber composition as described in claim 9, wherein the tertiary amine compound represented by Formula (I) has a molecular weight of 180 or more.

11. The method of preparing the rubber composition as described in claim 9, wherein Formula (I) represents a dimethylalkylamine in which $R_1$ and $R_2$ are both a methyl group and $R_3$ has 12 to 36 carbon atoms.

12. The method of preparing the rubber composition as described in the claim 9, wherein the tertiary amine compound represented by Formula (I) is dimethylstearylamine.

13. The method of preparing the rubber composition as described in claim 9, wherein carbon black is mixed in an amount of 20 to 80 parts by weight per 100 parts by weight of the rubber component.

14. The method of preparing the rubber composition as described in claim 9, wherein the blending amount of the tertiary amine compound 3 to 10% by weight based on the amount of silica.

15. A pneumatic tire comprising a tread art, a side wall part and a bead part, wherein said tread part comprises the rubber composition prepared by a method described in any one of claims 9–14.

16. A rubber composition comprising 15 to 85 parts by weight of silica per 100 parts by weight of a rubber component consisting of at least one rubber selected from the group consisting of natural rubber (NR), synthetic polyisoprene rubber (IR), polybutadiene rubber (BR) and styrene-butadiene rubber (SBR), a vulcanizing agent, a silane coupling agent in a proportion of 1 to 15% by weight based on the amount of silica, and a tertiary amine compound represented by the following Formula (I) blended in a proportion of 1 to 15% by weight based on the amount of silica:

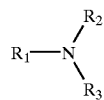
(I)

wherein $R_1$ represents an alkyl group, an alkenyl group, a hydroxy-substituted alkenyl group, an alkoxyl group having 1 to 36 carbon atoms or a hydroxy-substituted alkoxyl group having 1 to 36 carbon atoms, a benzyl group, a benzyl group substituted with an alkyl group or a benzyl group substituted with an alkenyl group having 4 to 36 carbon atoms, or a group represented by the following Formulae (II); and $R_2$ and $R_3$ represent independently an alkyl group, an alkenyl group or a hydroxy-substituted alkenyl group having 1 to 36 carbon atoms, a benzyl group, a hydroxy-substituted benzyl group, a cyclohexyl group or a hydroxy-substituted cyclohexyl group:

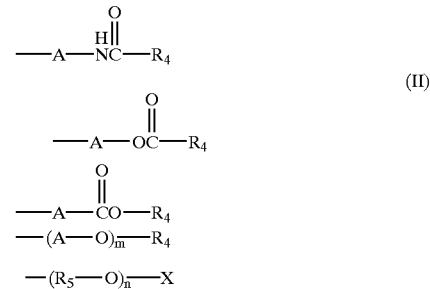
(II)

wherein $R_4$ represents an alkyl group or alkenyl group having 1 to 36 carbon atoms; $R_5$ represents an ethylene group or a propylene group; X represents an alkyl group, an alkenyl group, an alkanoyl group or an alkenoyl group having 1 to 18 carbon atoms; A represents an alkylene group or a hydroxyalkylene group having 2 to 6 carbon atoms; m is an integer of 1 to 10, and when m is 2 or more, each respective A may be the same or different; and n is an integer of 1 to 10.

* * * * *